US012353807B2

United States Patent
Vallabhaneni et al.

(10) Patent No.: US 12,353,807 B2
(45) Date of Patent: Jul. 8, 2025

(54) AUTOMATED RESERVOIR MODEL PREDICTION USING ML/AI INTERGRATING SEISMIC, WELL LOG AND PRODUCTION DATA

(71) Applicant: Landmark Graphics Corporation, Houston, TX (US)

(72) Inventors: Sridharan Vallabhaneni, Bangalore (IN); Samiran Roy, Bengaluru (IN); Soumi Chaki, West Bengal (IN); Bhaskar Jogi Venkata Mandapaka, Bangalore (IN); Rajeev Pakalapati, Bangalore (IN); Shreshth Srivastav, Noida (IN); Satyam Priyadarshy, Herndon, VA (US)

(73) Assignee: Landmark Graphics Corporation, Houston, TX (US)

( * ) Notice: Subject to any disclaimer, the term of this patent is extended or adjusted under 35 U.S.C. 154(b) by 865 days.

(21) Appl. No.: 17/016,075

(22) Filed: Sep. 9, 2020

(65) Prior Publication Data

US 2022/0075915 A1     Mar. 10, 2022

(51) Int. Cl.
*G06F 30/27*     (2020.01)
*G01V 1/28*     (2006.01)
(Continued)

(52) U.S. Cl.
CPC .............. *G06F 30/27* (2020.01); *G01V 1/282* (2013.01); *G01V 1/302* (2013.01); *G01V 2210/614* (2013.01); *G06F 2113/08* (2020.01)

(58) Field of Classification Search
CPC .. G01V 2210/614; G01V 1/302; G01V 1/282; G06F 30/27
See application file for complete search history.

(56) References Cited

U.S. PATENT DOCUMENTS

| 5,444,619 A | 8/1995 | Hoskins et al. |
| 8,510,242 B2 | 8/2013 | Al-Fattah |
(Continued)

FOREIGN PATENT DOCUMENTS

| WO | 2014146004 A3 | 9/2014 |
| WO | 2015187387 A1 | 12/2015 |

OTHER PUBLICATIONS

Alfarraj, et al., "Petrophysical Property Estimation From Seismic Data Using Recurrent Neural Networks", SEG International Exposition and Annual Meeting, 2018, 5 pages.
(Continued)

*Primary Examiner* — Bijan Mapar
(74) *Attorney, Agent, or Firm* — DeLizio, Peacock, Lewin & Guerra, LLP

(57) ABSTRACT

Methods and apparatus for generating one or more reservoir 3D models are provided. In one or more embodiments, a method can include training a first machine learning model to generate one or more integrated enhanced logs based, at least in part, on an integrated data set, wherein the integrated data set includes seismic data and well log data; generating one or more integrated enhanced logs from the first machine learning model; grouping the one or more integrated enhanced logs into an ensemble of integrated enhanced logs to form a static reservoir 3D model of a subterranean reservoir; inputting additional data to the first machine learning model to produce one or more updated integrated enhanced logs; and grouping the one or more updated integrated enhanced logs into an ensemble of updated integrated enhanced logs to form an updated 3D model.

15 Claims, 6 Drawing Sheets

(51) Int. Cl.
*G01V 1/30* (2006.01)
*G06F 113/08* (2020.01)

(56) References Cited

U.S. PATENT DOCUMENTS

| | | | |
|---|---|---|---|
| 8,577,660 B2 | 11/2013 | Wendt et al. | |
| 8,849,639 B2 | 9/2014 | Brown et al. | |
| 9,501,740 B2 | 11/2016 | Hiu et al. | |
| 9,703,006 B2 | 7/2017 | Stern et al. | |
| 2005/0207278 A1* | 9/2005 | Reshef | G01V 1/362 367/38 |
| 2012/0261135 A1* | 10/2012 | Nowak | G01V 1/301 702/14 |
| 2017/0096881 A1* | 4/2017 | Dusterhoft | G06N 20/00 |
| 2020/0334577 A1* | 10/2020 | Anderson | G06Q 10/063 |
| 2022/0327324 A1* | 10/2022 | Chen | E21B 47/00 |

OTHER PUBLICATIONS

Chaki, et al., "A Novel Preprocessing Method Based on Variational Mode Decomposition for Reservoir Characterization Using Support Vector Regression", IEEE Journal of Selected Topics in Applied Earth Observations and Remote Sensing, 2019, 10 pages.

Chaki, et al., "A Novel Preprocessing Scheme to Improve the Prediction of Sand Fraction From Seismic Attributes Using Neural Networks", IEEE Journal of Selected Topics in Applied Earth Observations and Remote Sensing, vol. 8, No. 4, 2015, 13 pages.

Chaki, et al., "Well-Log and Seismic Data Integration for Reservoir Characterization", IEEE Signal Processing Magazine, 2018, 10 pages.

Gan, et al., "Artificial Intelligent Logs for Formation Evaluation Using Case Studies in Gulf of Mexico and Trinidad & Tobago", Society of Petroleum Engineers, 2019, 13 pages.

Koseluk, "Applying Artificial Intelligence to Seismic Data for Enhanced Earth Modeling", 1st Subsurface Intelligence and Analytics Conference, Quantico Energy Solutions, 2019, 16 pages.

Lim, "Reservoir properties determination using fuzzy logic and neural networks from well data in offshore Korea", Journal of Petroleum Science and Engineering, 2005, 11 pages.

Saikia, et al., "Artificial Neural Networks in the Domain of Reservoir Characterization: A Review from Shallow to Deep Models", Computer & Geosciences, vol. 135, 2020, 58 pages.

Taylor, et al., "Seeing-ahead-of-the-bit: A game changer enabled by Machine Learning", American Rock Mechanics Association, 2020, 7 pages.

PCT Application No. PCT/US2020/050317, International Search Report, mailed May 26, 2021, 4 pages.

PCT Application No. PCT/US2020/050317, Written Opinion, mailed May 26, 2021, 4 pages.

* cited by examiner

AUTOMATED RESERVOIR MODEL PREDICTION USING ML/AI INTERGRATING SEISMIC, WELL LOG AND PRODUCTION DATA

TECHNICAL FIELD

The disclosure generally relates to the field of reservoir modeling and more specifically to reservoir model creation using machine learning (ML) and/or artificial intelligence (AI).

BACKGROUND

Reservoir modeling involves the creation of a three-dimensional representation of a subsurface or subterranean reservoir based on its petrophysical, geological and geophysical properties. Reservoir modeling can include both static and dynamic models. Typically, reservoir modeling is a time intensive process, often taking weeks. Many steps, such as geophysical interpretation in time domain, development of a geological framework in depth domain, fault modeling, grid generation, upscaling of the model, property distribution inside the grids, and, dynamic simulation with the static grid for reservoir behaviors, can be lengthy and/or manually intensive process, depending on complexity.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to various systems and environments to provide seismic and or well log data in illustrative examples. Embodiments of this disclosure can also obtain data from other systems and environments, e.g., a production environment. In other instances, well-known instruction instances, protocols, structures, and techniques have not been shown in detail in order not to obfuscate the description.

Artificial intelligence (AI) or machine learning and preprocessing via seismic enhancement and matching can utilize one or more sources of seismic data or attributes and well log data to train a first machine learning model. Integrated enhanced logs generated from the first machine learning model can be grouped into an ensemble of integrated enhanced logs to form a static reservoir 3D model. Then, using real time data and the first machine learning model, updated integrated enhanced logs can be generated and then grouped into an ensemble of updated integrated enhanced logs to form an updated 3D model. Using the updated 3D model and dynamic modeling data, machine learning can again be used to train a dynamic machine learning (ML) model. Based on dynamic (ML) model, a dynamic reservoir 3D model can be generated.

This methodology can be performed without workflows like manual geophysical interpretations, geological framework building, fault networking, fault modelling, etc. It can also be independent of interpretational bias by limiting manual intervention. For example, the methodology can avoid heavily time dependent steps of reservoir model prediction, including geophysical interpretation in time domain, geological framework in depth domain, fault modeling, grid generation, upscaling of the model, property distribution inside the grids, and dynamic simulation for reservoir behaviors with a static grid. The methodology also can be performed with geophysical interpretation, as geological or structural information is intrinsic within the seismic data and seismic attributes thereof.

Example Illustrations

Figure 1:
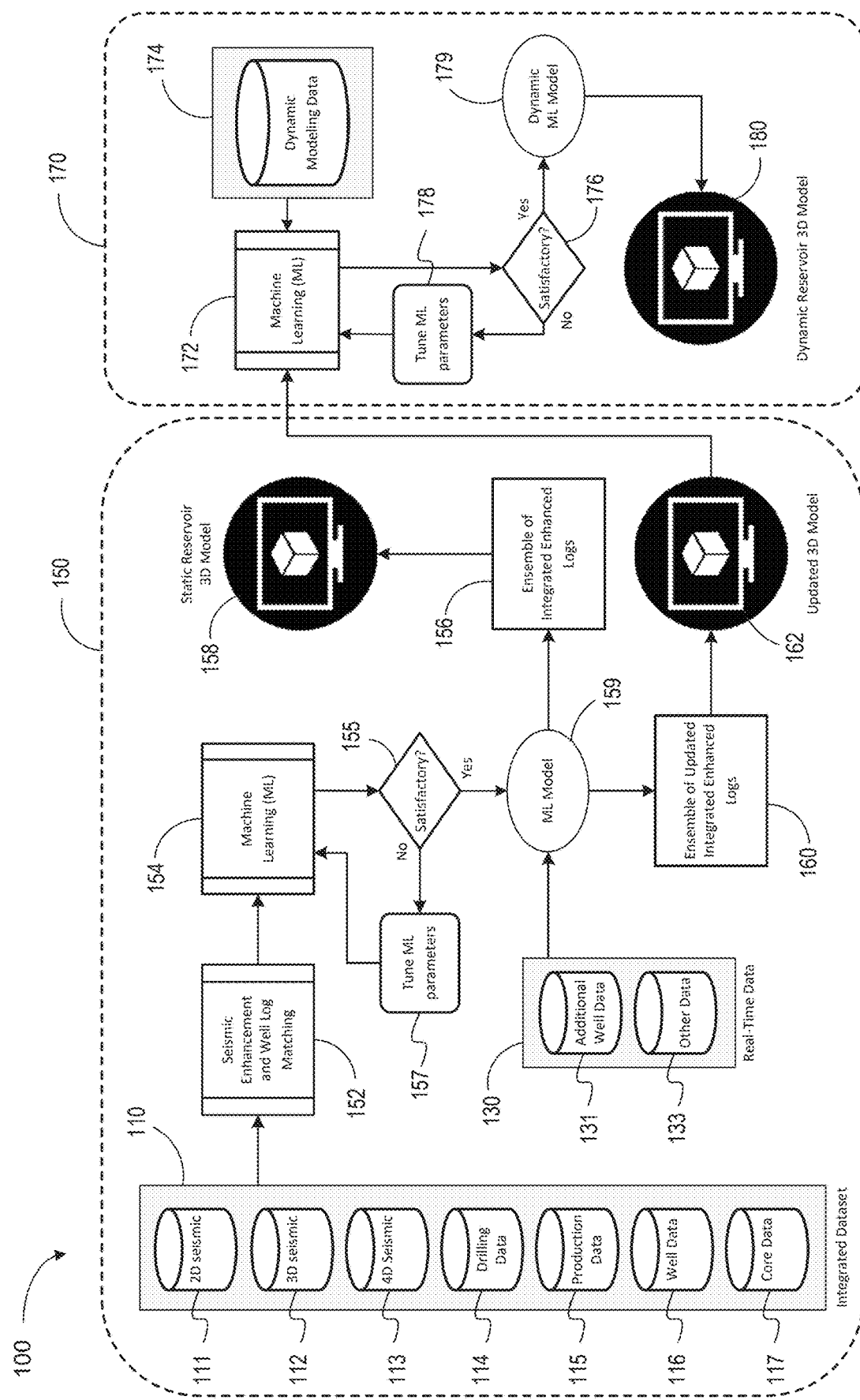
FIG. 1 is a flowchart of a method for automated reservoir model prediction using machine learning or artificial intelligence, according to one or more embodiments.

FIG. 1 is a flowchart of workflow 100 for automated reservoir model prediction using machine learning or artificial intelligence, according to one or more embodiments. The workflow 100 includes at least two process (a first process 150 and a second process 170) for outputting a static reservoir 3D model 158, an updated 3D model 162, and a dynamic reservoir 3D model 180 of a subterranean reservoir. FIG. 1 is annotated with a series of numbers that represent stages of operations in some instances as well as resulting 3D reservoir models as outputs. Although these stages are ordered for this example, the stages illustrate one example to aid in understanding this disclosure and should not be used to limit the claims. Subject matter falling within the scope of the claims can vary with respect to the order and some of the operations.

In the first process 150, one or more data sources are integrated to provide an integrated data set 110. The one or more data sources include, but are not limited to, seismic data (e.g., 2D seismic attributes 111, 3D seismic attributes 112, 4D seismic attributes 113, or a combination thereof) and well log data (e.g., drilling data 114, production data 115, well data 116, core data 117, or a combination thereof). Although not shown, other data sources, e.g., from formation evaluation logs, microseismic, mud logs, or other information about a geological reservoir or system of reservoirs, can also be included in the integrated data set 110. The well log data can be from a single well or from a plurality of wells. A plurality of wells can provide an increased set of data, and an increased data set can improve the accuracy of the static reservoir 3D model 158, the updated 3D model 162, and the dynamic reservoir 3D model 180. Both the seismic data and the well log data can be extracted from data with any format, including raw data, various data file formats (e.g., segy, las, xml), or a combination thereof.

Two dimensional (2D) seismic data can be obtained from 2D seismic acquisition, i.e., seismic acquisition from a single line of seismic sensors, e.g., hydrophones, geophones, or the like. Similarly, three dimensional (3D) seismic data can be obtained from 3D seismic acquisition, i.e., seismic acquisition from a grid or array of seismic sensors, e.g., hydrophones, geophones, or the like. The 2D seismic attributes 111 can be computed from the 2D seismic data, and the 3D seismic attributes 112 can be computed from the 3D seismic data. In one or more embodiments, the 2D seismic attributes 111 and 3D seismic attributes 112 can include a subset of possible post-stack attributes, such as attributes selected as most relevant to the integrated data set and/or the model prediction. Selecting or preselecting relevant 2D seismic attributes 111 and/or 3D seismic attributes 112 can speed up computational time.

Time-lapse or "4D" seismic data can be obtained by acquiring 2D and/or 3D seismic data over time for a producing reservoir. The 4D seismic attributes 113 can be computed from the 4D seismic data. In one or more embodiments, the 4D seismic attributes can include a subset of possible 4D seismic attributes, such as attributes selected as most relevant to the integrated data set and/or the model prediction. Selecting or pre-selecting relevant 4D seismic attributes can speed up computational time.

The 2D/3D/4D seismic attributes are derived from three basic attributes of a seismic signal: phase, frequency, and amplitude. Attributes can include, but are not limited to, reflection strength, relative amplitude change, response amplitude, root mean square (RMS) amplitude, apparent polarity, cosine of phase, response phase, average frequency, bandwidth, instantaneous frequency, quality factor, response frequency, RMS frequency, thin bed indicator, azimuth, dip, discontinuity, discontinuity along dip, mean curvature, most negative curvature, most positive curvature, relative amplitude change in X, relative amplitude change in Y, dull surface, shiny surface, semi-shiny surface, arc length, energy half-time, relative acoustic impedance, sweetness, or a combination thereof. Further the attributes can be pre-processed by resampling, applying phase rotation, and/or applying various filters, e.g., bandpass, butterworth, derivative, Laplacian, median, Ormsby, quadrature, etc. Attributes can also be pre-processed by taking the absolute value, bulk shifting, flattening, removing direct current (DC) bias, taking the reverse polarity, applying mistie correction, taking the signed square or the square value, taking the square root, or a combination thereof. A correlation study can be applied to select the most relevant attributes and pre-processing. The seismic attributes can intrinsically contain geological or structural information of the reservoir.

At block 152 seismic enhancement is applied to the seismic data in the integrated data set 110 (e.g., to the 2D seismic attributes 111, the 3D seismic attributes 112, and the 4D seismic attributes 113, or a combination thereof) to provide enhanced seismic data. The well log data (e.g., the drilling data 114, the production data 115, the well data 116, the core data 117, or the like) is matched with the enhanced seismic data to produced matched enhanced seismic data.

Seismic enhancement can include seismic frequency enhancement to increase vertical resolution of the seismic attributes. Resolution related to downhole measurements, especially with regard to seismic or acoustic data, is the distance increments geological features can be identified or resolved. With seismic or acoustic measurement—and therefore the data and attributes—the geological features, e.g., layers, are determined from the reflections of the waves. For two reflections, one from the top and one from the bottom of a thin layer, there is a limit on how close they can be, yet still be separable. This limit depends on the thickness of the layer or feature. Resolution can be measured in meters (m) and vertical resolution can be defined by Equation 1:

$$R=\lambda/4 \quad (1)$$

where R is the resolution, $\lambda$ is the wavelength of the seismic waves. Note, while the denominator in Equation 1 is 4, other denominators have been used, e.g. 8. The wavelength of a seismic wave is given by Equation 2:

$$\lambda=v/f \quad (2)$$

where v is velocity of the seismic wave in the subsurface measured in meters/second (m/s) and f is the dominant frequency in hertz (Hz) of the wave. Seismic wave velocities in the subsurface can vary, for example ranging between 500 m/s and 10,000 m/s or ranging between 2000 m/s and 5000 m/s, and generally increase with depth. The dominant frequency of the seismic signal generally decreases with depth and can range between 100 Hz and 10 Hz or between 50 Hz and 20 Hz. As such, seismic wavelengths can range from 40 m to 250 m and generally increase with depth. Since wavelength determines resolution, deep features must be thicker than the shallow features to be resolvable.

Thus, applying the above equations, the vertical resolution can be determined based on the seismic velocity and the dominant frequency, as shown in Table 1 below.

TABLE 1

| v (m/s) | f(Hz) | R= $\lambda/4$ (m) |
|---|---|---|
| 500 | 100 | 1.25 |
| 1000 | 75 | 3.33 |
| 2000 | 50 | 10 |
| 3000 | 40 | 18.75 |
| 4000 | 30 | 33.33 |
| 5000 | 20 | 62.5 |
| 10000 | 10 | 250 |

As can be seen from Table 1, increased depth results in a lower frequency, higher wavelength, and thus lower resolution (increased distance). Likewise, with shallower depth and thus increased frequency, there can be increased resolution. The resolution, even at shallower depths, can be less than the resolution of well log data, as well log data can be in centimeters or even millimeters, depending on the technology used to obtain the data. Note, lateral resolution can be accounted for as well and can include factoring in the Fresnel-zone width. Seismic resolution can include both vertical and lateral resolution.

Seismic data and therefore the seismic attributes can be bandlimited data. To increase the resolution, e.g., the vertical resolution, lateral resolution or both, enhancement can be applied. Any seismic enhancement technique can be applied. For example, deconvolution can be applied to broaden the spectrum thereby increasing the resolution. In another example, the high frequency content, i.e., the frequency content greater than the dominant frequency, of the seismic attributes can be enhanced by 5%, 10%, 20%, 50%, e.g., a 30 m resolution can be enhanced to 5 meters. It is possible that the enhancement to the high frequency content can compromise the resolution by introducing noise. However, machine learning (as described below) can account for the noise to provide enhanced resolution. If the resolution is still too large, the seismic data can be downscaled by resampling, such at every 1 m or every 5 m. The resampling can be done with a continuous data seismic trace form.

The seismic data can also be enhanced with spectral whitening. Spectral whitening can be described by Equation (3), $$\tilde{A}(f)=A^x(f) \quad (3)$$

where $\tilde{A}(f)$ is the whitened spectrum, $A(f)$ is the original spectrum, and $\chi$ is an exponent with a value between 0 and 1. Spectral whitening broadens the bandwidth of the seismic data by raising the amplitude spectrum to an exponent x with a value between 0 and 1. An exponent of 0 flattens the spectrum perfectly, an exponent of 1 leaves the spectrum unaltered, and an exponent between 0 and 1 flattens the spectrum while retaining some degree of spectral character. The whitened spectrum retains some spectral character because the analysis windows are never long enough to justify the assumption that the overall reflectivity is white.

Once the resolution of seismic data and attributes are enhanced, the seismic attributes (2D seismic attributes 111, 3D seismic attributes 112, and 4D seismic attributes 113) can be matched with the well log data (e.g., the drilling data 114, the production data 115, the well data 116, the core data 117, etc., or a combination thereof). Note, in one or more embodiments, seismic data or attributes can be matched to the well log data with or without enhancement of the seismic data.

Matching can be done in various ways. For example, in one or more embodiments, data from groups of wells can be divided into two different groups based on spud dates of the wells. The spud date is the date when drilling of a well is commenced. Well log data from the first group could be matched with the 3D seismic attributes 112 and well log data from the second group can be matched to the 4D seismic attributes. This allows better matching between the seismic attributes. Older seismic data in the first group, i.e., data from earlier spud dates may represent the subsurface prior to change. New seismic data in the second group, i.e., data from later spud dates, may correlate to subsurface after production or after change to subsurface.

In another example, the well log data can be matched with the seismic data by bringing well log data and the seismic data to the same sampling rate. Prior to matching well log data and seismic data may have very different sampling rates, e.g., the well log data may have a 5 cm sample rate compared to seismic data having a 10 m sampling rate. To address this difference in sampling intervals, sets of data that need to be matched can be resampled. For example, resampling can be done using the Nyquist formula to determine the maximum and minimum sampling rate for both the well log data and seismic data. A common sample rate can then be determined, and the data can be resampled at that rate allowing matching of the seismic and well log data. In one or more embodiments, both kinds of matching, i.e., grouping data be spud date and by resampling, can be used together to improve matching of the data.

In addition, different sources of well log data (e.g., the drilling data 114, the production data 115, the well data 116, the core data 117, etc., or a combination thereof) are also matched with each other. For example, well log data of the same resolution, i.e., having the same scale, can be matched together without further enhancement. However, when the resolution of different well log data is not the same, the same or similar techniques as those described above, e.g., whitening, resampling, or a combination thereof, can be applied to some or all the well log data to allow matching of the different well log data sources.

Next, blocks 154, 155, and 157 describe training of a first machine learning (ML) model 159 based, at least in part, on the integrated data set. In one or more embodiments, the first ML model 159 is trained using enhanced seismic data and the matched well log data. The process of training automatically adjusts parameters to get better results in the first ML model 159.

At block 154, machine learning begins to train the first ML model 159 using default values and then updating the default values iteratively using the enhanced seismic data and matched well log data as inputs. The machine learning can be deep learning and can utilize a first neural network having one or more layers. In one or more embodiments, the first neural network includes input nodes, output nodes, hidden layers, and hidden nodes (i.e., nodes in each hidden layer). The first neural network can be of various types including, but not limited to, feed forward (FF), radial basis (RBF), deep feed forward (DFF), recurrent neural network (RNN), long/short term memory (LSTM), gated recurrent unit (GRU), auto encoder (AE), variational AE (VAE), denoising AE (DAE), spars AE (SAE), deep belief network (DBN), deep convolutional network (DCN), deconvolutional network (DN), deep convolutional inverse graphics network (DCIGN), generative adversarial network (GAN), liquid state machine (LSM), extreme learning machine (ELM), echo state network (ESN), deep residual network (DRN), neural Turing machine (NTM), or the like. In one or more embodiments, the second neural network is a deep neural network (DNN). The number of input nodes can be the same as a number of selected seismic attributes, and the number of output nodes can be the same as a number of target petrophysical properties.

At block 155, the output of the machine learning at block 154 is checked to determine whether the output is "satisfactory," i.e., evaluating performance of the first ML model 159. For example, the first ML model 159 can be checked to evaluate the performance of the training.

In one or more embodiments, the first ML model 159 is checked, at least in part, by a domain expert reviewing the output and categorizing or grading the outputs. In addition to checking by a domain expert or in the alternative, in one or more embodiments, one or more statistical metrics or methods is used to evaluate the performance of the first ML model 159. The statistical methods can include, but are not limited to, Mean Squared Error (MSE) and R-squared (R2). MSE is called the mean squared error as it finds the average or mean of a set of errors. MSE determines how close a regression line is to a set of points by taking the distances from the points to the regression line (these distances are the "errors") and squaring them. The squaring is necessary to remove any negative signs. It also gives more weight to larger differences. A lower MSE value indicates better model performance. R2 is a statistical measure that represents the proportion of the variance for a dependent variable that is explained by an independent variable or variables in a regression model. Whereas correlation explains the strength of the relationship between an independent and dependent variable, R2 explains to what extent the variance of one variable explains the variance of the second variable. So, if the R2 of a model is 0.50, then approximately half of the observed variation can be explained by the model's inputs. A higher R2 score indicates the better model performance. As such the MSE value and/or the R2 score can be used to determine whether the output to the machine learning is satisfactory. When the output is satisfactory, first ML model 159 can be updated automatically.

If the output of the machine learning at block 154 is not satisfactory, at block 157, parameters of the machine learning are tuned. For example, a user can control model tuning parameters to adjust the performance for desired outputs of the machine learning at block 154. Parameters that can be tuned include, but are not limited to, the number of hidden layers of the DNN, the number of neurons in each hidden layer, activation functions, loss functions, one or more optimization algorithms, or a combination thereof. In one or more embodiments, the tuning can be contextualized hyperparameter tuning.

Once the first ML model 159 is deemed satisfactory or during the machine learning process, the first ML model 159 generates one or more integrated enhanced logs. The one or more integrated enhanced logs from the first ML model 159 are assembled or grouped into an ensemble of integrated enhanced logs 156 to output or form a static reservoir 3D model 158. Integrated enhanced logs are logs of reservoir properties that have been generated through the machine learning approach integrating seismic data, drilling data, production data, core data, micro-seismic data, well log data, and/or the like. The integrated enhanced logs can be machine learning generated logs of the 2D properties of the reservoir. For example, the integrated enhanced logs can be a generated log of 2D property varying in the z direction for a particular x,y coordinate system. Integrated enhanced logs can be generated for all possible x,y location for an area of interest. These integrated enhanced logs can be grouped to provide an ensemble of integrated enhanced logs 156 to the static reservoir 3D model 158.

The static reservoir 3D model 158 is formed from the ensemble of integrated enhanced logs 156. The static reservoir 3D model 158 thus includes the ensembles of 2D properties (e.g., in the form of the integrated enhanced logs) for the whole 3D space. In one or more embodiments, the static reservoir 3D model 158 can be a multi-resolution geocellular model that represents the size, shape, orientation, composition, and internal arrangement of a reservoir. The static reservoir 3D model 158 is "static" because it is on the initial data and attributes provided in the integrated data set 110. The static reservoir 3D model 158 can be visualized via a user interface, e.g., a monitor coupled to a processor, or can be printed (e.g., on paper or as a physical model via 3D printer).

Once the first ML model 159 has been trained, additional data, such as real-time data 130, can be then input to the first ML model 159 to produce one or more updated integrated enhanced logs. The one or more updated integrated enhanced logs are grouped into an ensemble of updated integrated enhanced logs 160 to form the updated 3D Model 162. The updated 3D model 162 can be constantly or at least iteratively updated based on the real-time data 130. The updated 3D model 162 can be visualized via a user interface, e.g., a monitor coupled to a processor.

Real-time data 130 can include any of the data sources provided in integrated data set 110. For example, as depicted, real-time data 130 can include additional well data 131 and other data 133. In one or more embodiments, additional well data 131 can be well log data acquired after well log data in the integrated data set 110, and other data 133 can be additional seismic attributes acquired after the 2D seismic attributes 111, 3D seismic attributes 112, and 4D seismic attributes 113 were acquired. For example, additional well data 131 can include data acquired from drilling a new well in the reservoir such as data acquired using logging-while-drilling (LWD) or measuring-while-drilling (MWD). Additional well data 131 can also include data from sensors in a smart or intelligent completion, from sensors from producing well, or from a new logging run in a wellbore located in the reservoir. In one or more embodiments, real-time data 130 can be fed to the first ML model 159 in real time, near real time, or in batch. To fee data in "near real time" means the data has been delayed by at least of communication or processing time. "Batch" means the data has not been delivered continuously and can refer to intermittent transmission or input. Regardless, real-time data 130 represents new data that can update (and thereby improve) the first ML model 159 resulting in the updated 3D model 162. For example, with each new set of data from the real-time data 130, the first ML model 159 can be updated to provide the updated 3D model 162. As such, the updated 3D model 162 represents the most up-to-date 3D model of the reservoir based on the latest transmission or input of real-time data 130.

Although not depicted, in one or more embodiments, the real-time data 130 or other additional data can be used to re-train the first ML model 159. Once re-trained, first ML model 159 can update the static reservoir 3D model 158, e.g., recreating it or updating a portion of it, can update the updated 3D model 162, or both. Retraining of the first ML model 159 can occur in a short amount of time. For example, using a general processing unit (GPU) on a workstation (i.e., a computer), retraining of the first ML model 159 can take less than 60 minutes, less than 50 minutes, less than 40 minutes, or less than 30 minutes.

In the second process 170, the updated 3D model 162 and additional data for dynamic modeling, i.e., dynamic modeling data 174, are used as inputs to further machine learning at block 172. The dynamic modeling data 174 can include data used to predict flow properties, such as porosity, pore pressure, pressure, choke, lithology, one or more velocity models, production rates, production history, flow properties, and other data related to flow properties obtained from production logging, formation evaluation, completion data, e.g., from an intelligent completion system, or any combination thereof. In one or more embodiments, the one or more velocity models can include hidden structural information in terms lateral heterogeneity.

Similar to the machine learning in the first process 150, blocks 172, 176, and 178 describe the training of a second or dynamic ML model 179 based, at least in part, on the updated 3D model 162 and, optionally, the dynamic modeling data 174. The process of training automatically adjusts parameters to get better results in the dynamic ML model 179.

At block 172, machine learning begins to create the dynamic ML model 179 using default values and then updating the default values iteratively using the dynamic modeling data 174 information in the updated 3D model 162 and, optionally, the dynamic modeling data 174 as inputs. In one or more embodiments, the dynamic modeling data 174 is used both for training the dynamic ML model 179 and as input to the dynamic ML model 179 once it has been trained. In other embodiments, only the updated 3D model 162 is used to training the dynamic ML model 179. In one or more embodiments, dynamic ML model 179 can be re-trained using the updated 3D model 162 and/or the dynamic modeling data 174. Like with the first ML model 159, retraining of the dynamic ML model 179 can occur in a short amount of time. For example, using a general processing unit (GPU) on a workstation (i.e., a computer), retraining of the dynamic ML model 179 can take less than 60 minutes, less than 50 minutes, less than 40 minutes, or less than 30 minutes.

In one or more embodiments, the dynamic ML model 179 can use the updated 3D model 162 or at least values therefrom as the starting point for the training process. Like the machine learning at block 154, the machine learning at block 172 can be deep learning and can utilize a second neural network having one or more layers. In one or more embodiments, the second neural network includes input nodes, output nodes, hidden layers, and hidden nodes. The second neural network can be can be of various types including, but not limited to, feed forward (FF), radial basis (RBF), deep feed forward (DFF), recurrent neural network (RNN), long/short term memory (LSTM), gated recurrent unit (GRU), auto encoder (AE), variational AE (VAE), denoising AE (DAE), spars AE (SAE), deep belief network (DBN), deep convolutional network (DCN), deconvolutional network (DN), deep convolutional inverse graphics network (DCIGN), generative adversarial network (GAN), liquid state machine (LSM), extreme learning machine (ELM), echo state network (ESN), deep residual network (DRN), neural Turing machine (NTM), or the like. In one or more embodiments, the second neural network is a deep neural network (DNN).

At block 176, the output of the machine learning at block 172 is checked to determine whether the output is "satisfactory," i.e., evaluating performance of the dynamic ML model 179. For example, dynamic ML model 179 can be checked to evaluate the performance of the training.

In one or more embodiments, the dynamic ML model 179 is checked, at least in part, by a domain expert reviewing the output and categorizing or grading the outputs. In addition to checking by a domain expert or in the alternative, in one or more embodiments, one or more statistical metrics or methods is used to evaluate the performance of the dynamic ML model 179. The statistical methods can include, but are not limited to, MSE and R2, as described above. The MSE value and/or the R2 score can be used to determine whether the output to the machine learning is satisfactory. When the output is satisfactory, dynamic ML model 179 is updated automatically.

At block 178, parameters of the machine learning are tuned if the output of the machine learning at block 172 is not satisfactory. For example, a user can control model tuning parameters to adjust the performance for desired outputs of the machine learning at block 172. Parameters that can be tuned include, but are not limited to, the number of hidden layers of the second neural network, the number of hidden nodes in each hidden layer, activation functions, loss functions, one or more optimization algorithms, or a combination thereof. In one or more embodiments, the tuning can be contextualized hyperparameter tuning.

The training of the dynamic ML model 179 generates the dynamic reservoir 3D model 180. The dynamic reservoir 3D model 180 is "dynamic" because it takes into account the fluid flow over time, including during production of hydrocarbons from the reservoir. For example, the dynamic ML model 179 can supply inputs to the dynamic reservoir 3D model 180 when training of the dynamic ML model 179 is complete or can supply inputs concurrently with training. In one or more embodiments, both the real-time data 130 (via the update 3D model) and the dynamic modeling data 174 can be inputs to the dynamic ML model 179 to dynamically update the dynamic reservoir 3D model 180. The dynamic reservoir 3D model 180 can be visualized via a user interface, e.g., a monitor coupled to a processor.

In one or more embodiments, the dynamic reservoir 3D model 180 can be used for reservoir simulation. As new dynamic modeling data 174 is obtained the dynamic reservoir 3D model 180 can be updated to reflect the newly acquired data.

The creation of the static reservoir 3D model 158, the updated 3D model 162, and the dynamic reservoir 3D model 180 can be accomplished in a matter of minutes or hours (depending on computation time) instead of the weeks and months required in a traditional process.

The flowchart in FIG. 1 is provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in the first process 150 and the second process 170 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media, e.g., one or more non-transitory machine readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, radio frequency (RF), etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute, or be executable, entirely on a stand-alone machine, in a distributed manner across multiple machines, and/or on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Example Seismic Data Acquisition Environments

Figure 2:
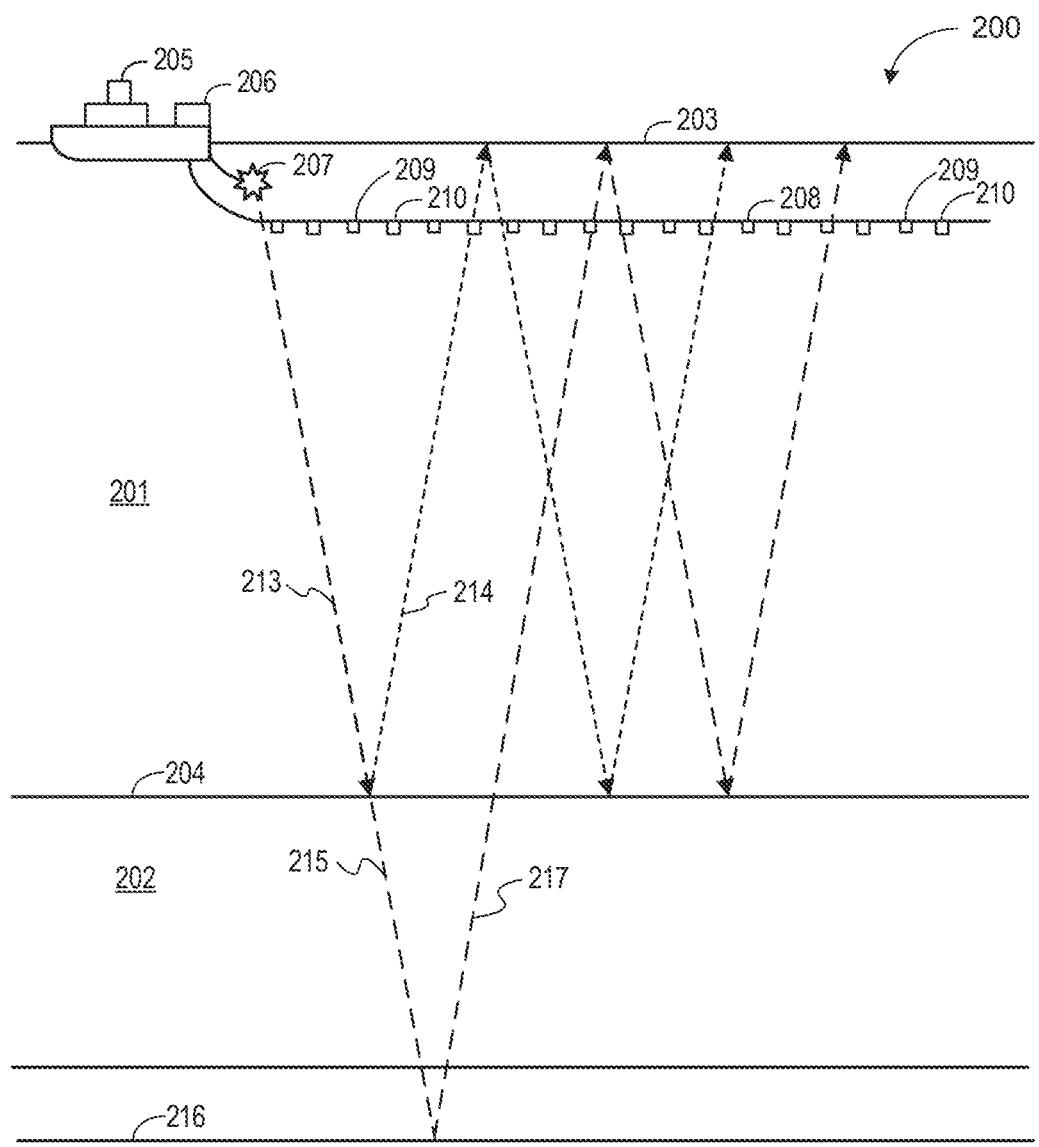
FIG. 2 depicts a schematic diagram of an elevation view of a marine seismic survey that can be used to provide seismic data, according to one or more embodiments.

FIG. 2 depicts a schematic diagram of an elevation view of a marine seismic survey 200 that can be used to provide seismic data, according to one or more embodiments. Seismic data from the marine seismic survey 200 can be used to provide the 2D seismic attributes 111, the 3D seismic attributes 112, and the 4D seismic attributes 113, as described above. A body of water 201 over earth 202 is bounded at a water surface 203 by a water-air interface and at a water bottom or seabed 204 by a water-earth interface. Beneath the seabed 204, the earth 202 contains subterranean formations of interest. A seismic vessel 205 travels on the water surface 203 and contains seismic acquisition control equipment 206. The seismic acquisition control equipment 206 includes navigation control, seismic source control, seismic sensor control, and recording equipment.

The seismic acquisition control equipment 206 can actuate a seismic source 207 towed in the body of water 201 by the seismic vessel 205 at selected times. One or more seismic streamers 208 can extend from the seismic vessel 205 into the body of water 201. In 2D seismic a single streamer can be used (as shown), whereas in 3D and 4D seismic two or more streamers extend to form a grid or array. The one or more seismic streamers 208 contain sensors to detect the reflected waves initiated by the seismic source 207 and reflected from interfaces in the environment. The one or more seismic streamers 208 can contain pressure sensors such as hydrophones 209 and/or water particle motion sensors such as geophones 210. The hydrophones 209 and geophones 210 can be y co-located in pairs or pairs of sensor arrays at regular intervals along the seismic streamers 208.

The seismic source 207 is activated at periodic intervals to emit acoustic waves in the vicinity of the seismic streamers 208 with the hydrophones 209 and the geophones 210. Each time the seismic source 207 is actuated, an acoustic wave travels upwardly or downwardly in spherically expanding wave fronts. The traveling waves will be illustrated by ray paths normal to the expanding wave fronts. The downwardly traveling wave from the seismic source 207 traveling along a ray path 213 will reflect off the earth-water interface at seabed 204 and then travel upwardly along ray path 214, where the wave can be detected by the hydrophones 209 and geophones 210. Such a reflection at the seabed 204, as in ray path 214, contains information about the seabed 204 and hence can be retained for further processing. Additionally, the downwardly traveling wave traveling along ray path 213 can transmit through the seabed 204 and travel along ray path 215 before reflecting off a layer boundary 216. This wave can then travel upwardly along ray path 217 and be detected by the hydrophones 209 and geophones 210. Such a reflection off the layer boundary 216 can contain useful information about subterranean formations of interest that can be used to generate seismic data.

Figure 3:
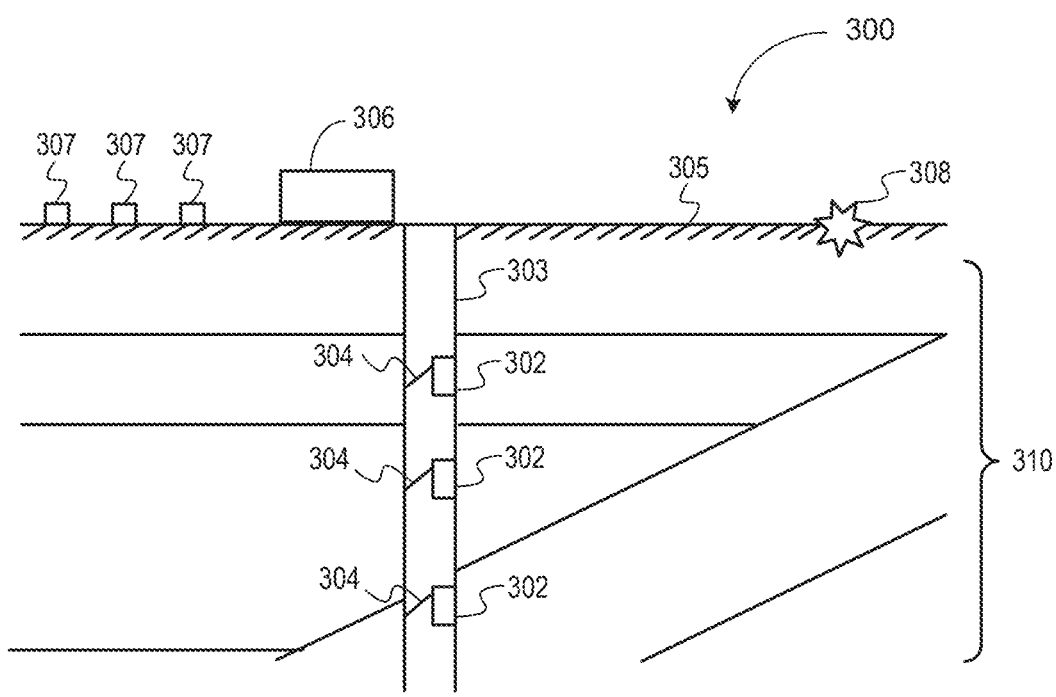
FIG. 3 depicts a schematic diagram of an onshore borehole seismic survey environment, according to one or more embodiments.

FIG. 3 depicts a schematic diagram of an onshore seismic survey 300, according to one or more embodiment. As with the marine seismic survey 200, the seismic data from the onshore seismic survey 300 can be used to provide the 2D seismic attributes 111, the 3D seismic attributes 112, and the 4D seismic attributes 113, as described above. Surface seismic receivers 307, e.g., geophones, can be arranged on the surface 305 in a line (2D) or in a grid or array (3D). Surface seismic receivers 307 can communicate wirelessly or via cable to a data acquisition unit 306. Borehole seismic receivers 302 can be spaced-apart arrangement within a wellbore or borehole 303 to detect seismic waves. As shown, the borehole seismic receivers 302 can be fixed in place by anchors 304 to facilitate sensing seismic waves. In one or more embodiments, the borehole seismic receivers 302 can be part of a logging-while-drilling (LWD) tool string or wireline logging tool string. Further, the borehole seismic receivers 302 can communicate wirelessly or via cable to the data acquisition unit 306. The data acquisition unit 306 can receive, processes, and/or store seismic signal data collected by the borehole seismic receivers 302 and the surface seismic receivers 307. To generate seismic signal data, surveyors trigger at least one seismic source 308 at one or more positions to generate seismic energy waves that propagate through a formation 310. Such waves reflect from acoustic impedance discontinuities to reach the borehole seismic receivers 302. Illustrative discontinuities include faults, boundaries between formation beds, and boundaries between formation fluids. The discontinuities can appear as bright spots in the subsurface structure representation that is derived from the seismic signal data. The collected seismic signal data can be used to generate the 2D seismic attributes 111, the 3D seismic attributes 112, and the 4D seismic attributes 113, as described above.

Although not depicted, in one or more embodiments, the 2D seismic attributes 111, the 3D seismic attributes 112, and the 4D seismic attributes 113 can be obtained from seismic data acquired using distributed acoustic sensing (DAS), where a fiber is deployed in the borehole 303, e.g., installed behind casing, run in a completed well with production tubing, or run with coiled tubing or wireline into the borehole. DAS can be deployed in an offshore or onshore environment with one or more seismic sources being deployed in water or the seabed (in a marine environment) or on the surface or just below the surface, e.g., below the overburden (in an onshore environment). DAS can be run in conjunction with the borehole seismic receivers 302, such as geophones or hydrophones, or can be run with only fiber.

Example Logging and Drilling Environments

Figure 4:
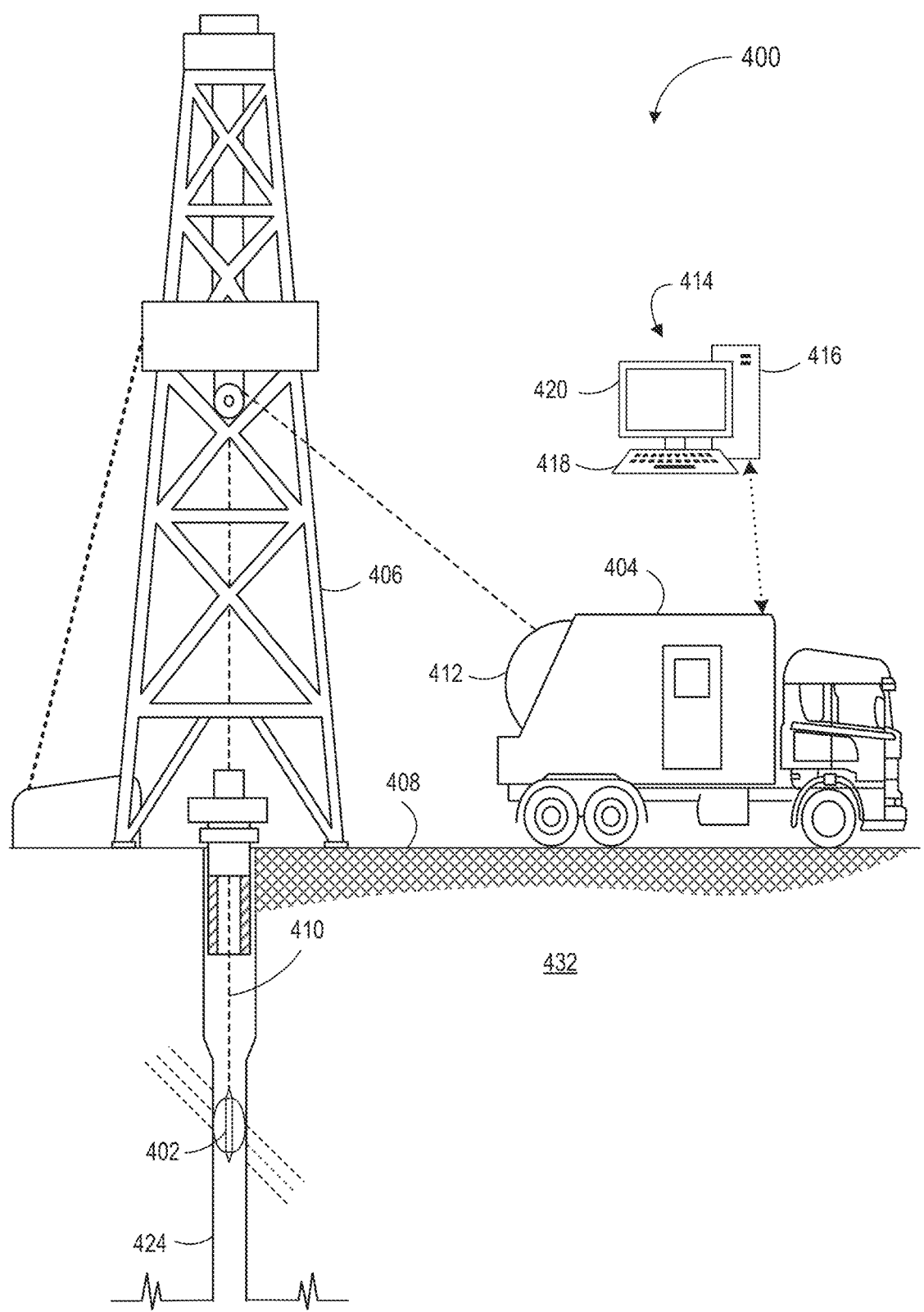
FIG. 4 is a schematic diagram of a well measurement system that can provide well log data, according to one or more embodiments.

FIG. 4 illustrates a is a schematic diagram of well measurement system 400 that can provide well log data (e.g., the production data 115, the well data 116, the core data 117, or any combination thereof), according to one or more embodiments. As illustrated, well measurement system 400 may include downhole tool 402 attached to a vehicle 404. In examples, it should be noted that downhole tool 402 may not be attached to a vehicle 404. Downhole tool 402 may be supported by rig 406 at surface 408.

Downhole tool 402 may be tethered to vehicle 404 through conveyance 410. Conveyance 410 may be disposed around one or more sheave wheels 412 to vehicle 404. Conveyance 410 may include any suitable means for providing mechanical conveyance for downhole tool 402, including, but not limited to, wireline, slickline, coiled tubing, pipe, drill pipe, drill string, downhole tractor, or the like. In some examples, conveyance 410 may provide mechanical suspension, as well as electrical connectivity, for downhole tool 402. Conveyance 410 may include, in some instances, a plurality of electrical conductors extending from vehicle 404. The electrical conductors may be used for communicating power and telemetry between vehicle 404 and downhole tool 402. Information from downhole tool 402 may be gathered and/or processed by information handling system 414. For example, signals recorded by downhole tool 402 may be stored on memory and then processed by downhole tool 402. The processing may be performed real-time during data acquisition or after recovery of downhole tool 402. Processing may alternatively occur downhole or may occur both downhole and at surface. In some examples, signals recorded by downhole tool 402 may be conducted to information handling system 414 by way of conveyance 410. Information handling system 414 may process the signals, and the information contained therein may be displayed for an operator to observe and stored for future processing and reference. Information handling system 414 may also contain an apparatus for supplying control signals and power to downhole tool 402.

Systems and methods of the present disclosure may be implemented, at least in part, with information handling system 414. While shown at surface 408, information handling system 414 may also be located at another location, such as remote from borehole 424. Information handling system 414 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 414 may be a processing unit 416, a network storage device, or any other suitable device and may vary in size, shape, performance, functionality, and price. Information handling system 414 may include random access memory (RAM), one or more processing resources such as a central processing unit (CPU) or hardware or software control logic, ROM, and/or other types of nonvolatile memory. Additional components of the information handling system 414 may include one or more disk drives, one or more network ports for communication with external devices as well as an input device 418 (e.g., keyboard, mouse, etc.) and video display 420. Information handling system 414 may also include one or more buses operable to transmit communications between the various hardware components.

In examples, downhole tool 402 may operate with additional equipment (not illustrated) on surface 408 and/or disposed in a separate well measurement system (not illustrated) to record measurements and/or values from formation 432 to render a measurement or log of formation 432. Processing of information measured or logged may occur downhole and/or on surface 408. These measurements, either raw or processed can form the well data 116. For example, well data 116 from the downhole tool 402 can include, but is not limited to, temperature, pressure, caliper, density, porosity, acoustic, gamma, pulsed neutron, resistivity, nuclear magnetic resonance (NMR), distributed acoustic sensing (DAS), distributed temperature sensing (DTS), or a combination thereof. In addition to, or in place of processing at surface 408, processing may occur downhole. Processing occurring downhole may be transmitted to surface 408 to be recorded, observed, and/or further analyzed. Additionally, information recorded on information handling system 414 that may be disposed downhole may be stored until downhole tool 402 may be brought to surface 408. In one or more embodiments, information handling system 414 may communicate with downhole tool 402 through a fiber optic cable (not illustrated) disposed in (or on) conveyance 410. Wireless communication may also be used to transmit information back and forth between information handling system 414 and downhole tool 402. Information handling system 414 may transmit information to downhole tool 402 and may receive as well as process information recorded by downhole tool 402. In one or more embodiments, a downhole information handling system (not illustrated) may include, without limitation, a microprocessor or other suitable circuitry, for estimating, receiving, and processing signals from downhole tool 402. Downhole information handling system (not illustrated) may further include additional components, such as memory, input/output devices, interfaces, and the like. While not illustrated, downhole tool 402 can include one or more additional components, such as analog-to-digital converter, filter and amplifier, among others, that may be used to process the measurements of downhole tool 402 before they may be transmitted to surface 408. In one or more embodiments, raw measurements from downhole tool 402 are transmitted to surface 408 without any processing thereof.

Any suitable technique may be used for transmitting signals from downhole tool 402 to surface 408. As illustrated, a communication link (which may be wired or wireless and may be disposed in conveyance 410, for example) may be provided that may transmit data from downhole tool 402 to an information handling system 414 at surface 408.

Although not shown, downhole tool 402, can include a coring tool and/or fluid sampling tool. The coring tool can cut and store cores for analysis, either downhole or at the surface, that can form the core data 117. The fluid sampling tool can sample formation fluid and/or drilling fluid to provide well data 116 or production data 115.

Figure 5:
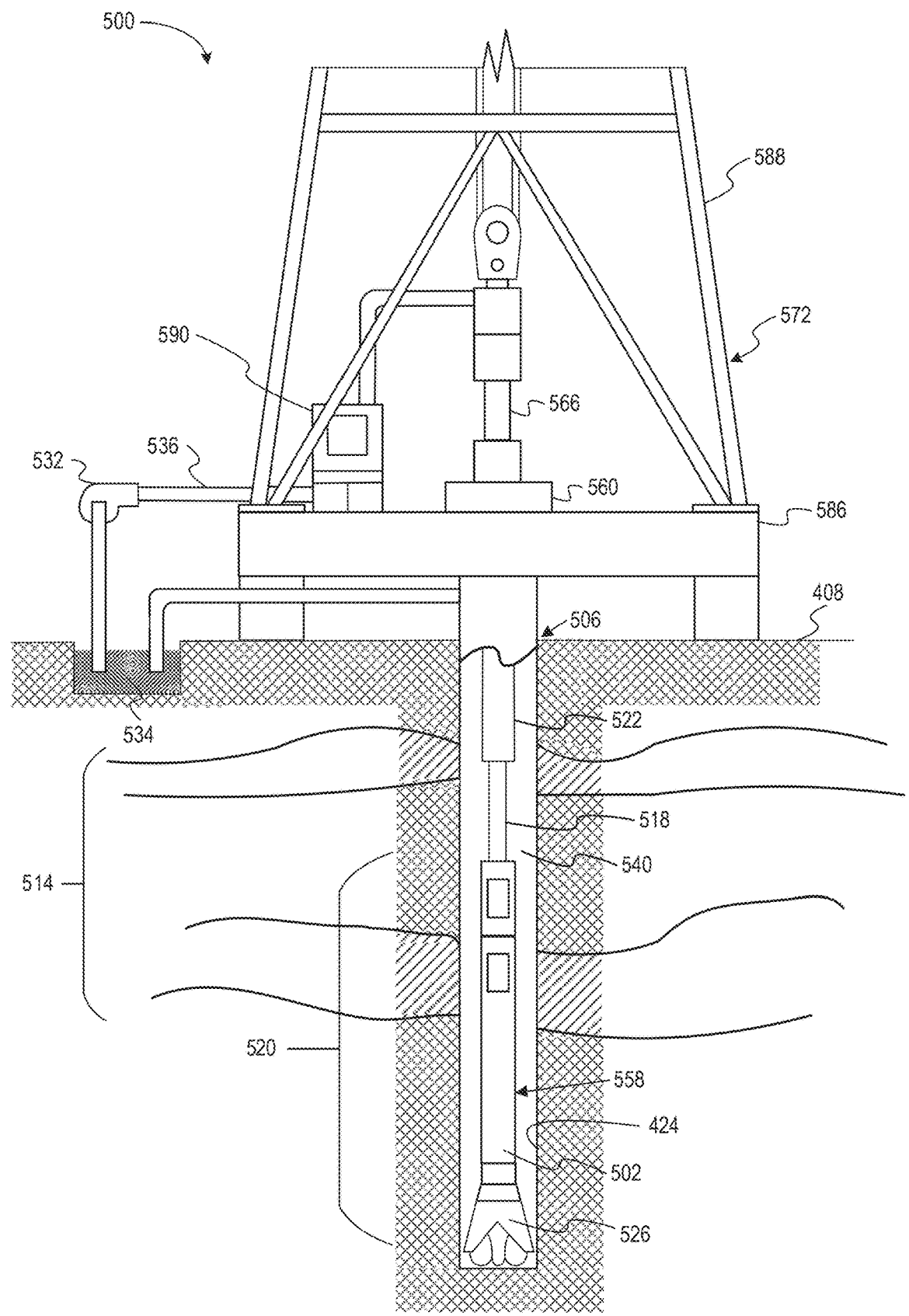
FIG. 5 is a schematic diagram of a drilling system that can provide well log data, according to one or more embodiments.

FIG. 5 is a schematic diagram of a drilling system 500 that can provide well log data (e.g., drilling data 114, well data 116, core data 117, or the like), according to one or more embodiments. Drilling system 500 includes a drilling rig 572 located at the surface 408 of a well 506. Drilling of oil and gas wells is carried out using a string of drill pipes connected together to form a drill string 558 that is lowered through a rotary table 560 into a wellbore or borehole 424. Here a drilling platform 586 is equipped with a derrick 588 that supports a hoist. A computer system 590 can be communicatively coupled to any measurements devices included in the drilling system 500.

The drilling rig 572 may thus provide support for the drill string 558. The drill string 558 may operate to penetrate the rotary table 560 for drilling the borehole 424 through subsurface formations 514. The drill string 558 may include a Kelly 566, drill pipe 518, and a bottom hole assembly (BHA) 520, perhaps located at the lower portion of the drill pipe 518.

The BHA 520 can include drill collars 522, a downhole tool 502, and a drill bit 526. The drill bit 526 may operate to create the borehole 424 by penetrating the surface 408 and subsurface formations 514. The downhole tool 502 may comprise any of a number of different types of tools including MWD tools, LWD tools, and others. The downhole tool 502 can be used to evaluate the subsurface formation 514 and/or to take samples of the formation, e.g., fluid or core samples, to provide drilling data 114, well data 116, and core data 117. In addition, drilling data 114 can be obtained from any parameters used during drilling including engineering parameters, drilling parameters (e.g., weight-on-bit (WOB), torque, rate of penetration, mud weight, or the like), MWD measurements (e.g., well path, inclination, azimuth, drill string rotation, vibration, temperature, mud flow volume, gamma, resistivity, or a combination thereof), or a combination thereof. Further, drilling data 114 and well data 116 can be obtained from LWD measurements (e.g., temperature, pressure, acoustic, gamma, pulsed neutron, resistivity, nuclear magnetic resonance (NMR), or a combination thereof).

During drilling operations, the drill string 558 (perhaps including the Kelly 566, the drill pipe 518, and the BHA 520) may be rotated by the rotary table 560. In addition to, or alternatively, the BHA 520 may also be rotated by a motor (e.g., a mud motor) that is located downhole. Further, during drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 408 through an annular area 540 between the drill pipe 518 and the sides of the borehole 512. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation 514 cuttings created by operating the drill bit 526. The cuttings and the drilling fluid can be analyzed to provide drilling data 114 and well data 116.

Figure 6:
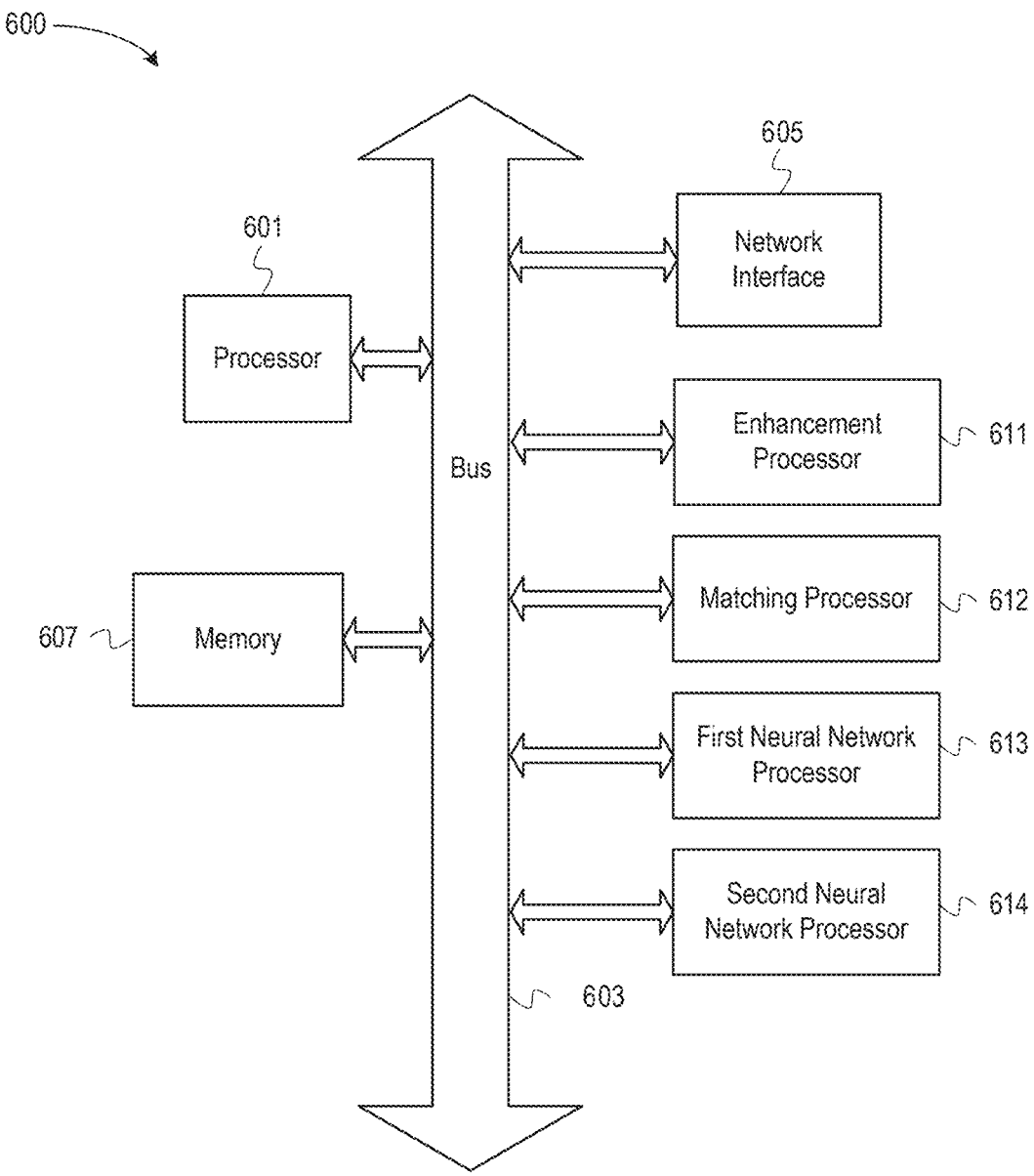
FIG. 6 depicts an example computer system with functionality and/or one or more processors for carrying out the systems and methods described herein, according to one or more embodiments.

FIG. 6 depicts an example computer system 600 with functionality and/or one or more processors for carrying out the systems and methods described above, according to one or more embodiments. The computer system includes a processor 601 (possibly including multiple processors, multiple cores, multiple nodes, and/or implementing multithreading, etc.). The computer system 600 also includes memory 607. The memory 607 may be system memory or any one or more of the above already described possible realizations of machine-readable media. The computer system 600 further includes a bus 603 and a network interface 605. The computer system 600 communicates via transmissions to and/or from remote devices via the network interface 605 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer system 600 also includes various functionalities or modules. In one or more embodiments, the computer system 600 includes an enhancement module or processor 611. The enhancement processor 611 can perform one or more operations to carry out seismic enhancement, including seismic frequency enhancement, spectral whitening, deconvolution, downscaling, resampling, or the like as described with respect to FIG. 1. The computer system 600 also includes a matching module or processor 612. The matching module or processor 612 can perform one or more operations to carry out matching of the well bore data with the seismic data and/or enhanced seismic data as described with respect to FIG. 1. The computer system 600 also includes a first neural network processor 613. The first neural network processor 613 can perform one or more operations to train the first ML model 159 and generate one or more integrated enhanced logs from input data that includes seismic data and well log data, e.g., the integrated data set 110 described above. The first neural network processor 613 can also group the one or more integrated enhanced logs into an ensemble of integrated enhanced logs to form the static reservoir 3D model 158. Further, based on updated inputs, e.g., real-time data 130, the first neural network processor 613 can generate updated integrated enhanced logs to provide the update 3D model 162. The computer system 600 also, optionally, includes a second neural network processor 614. The second neural network processor 614 can perform one or more operations to train the dynamic ML model 179 and to generate the dynamic reservoir 3D model 180. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601 directly.

While the aspects of the disclosure are described with reference to various implementations and exploitations, it will be understood that these aspects are illustrative and that the scope of the claims is not limited to them. In general, techniques for predicting and/or generating 3D reservoir models using machine learning, as described herein, may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Numerous examples are provided herein to enhance understanding of the present disclosure. A specific set of example embodiments are provided as follows:

Example A: A method comprising training a first machine learning model to generate one or more integrated enhanced logs based, at least in part, on an integrated data set, wherein the integrated data set includes seismic data and well log data; generating the one or more integrated enhanced logs from the first machine learning model; grouping the one or more integrated enhanced logs into an ensemble of integrated enhanced logs to form a static reservoir 3D model of a subterranean reservoir; inputting additional data to the first machine learning model to produce one or more updated integrated enhanced logs; and grouping the one or more updated integrated enhanced logs into an ensemble of updated integrated enhanced logs to form an updated 3D model.

The method in Example A can further comprise one or more of the following (in any order): (1) training a second machine learning model to generate a dynamic reservoir 3D model based, at least in part, on the updated 3D model and dynamic modeling data, wherein the dynamic modeling data includes data used to predict flow properties of the subterranean reservoir; (2) applying seismic enhancement to the seismic data to provide enhanced seismic data, wherein the first machine learning model is based on the enhanced seismic data, and, optionally, matching the well log data with the enhanced seismic data to produce matched well log data, wherein the first machine learning model is based on the matched well log data; and (3) preselecting at least one of relevant 2D seismic attributes, 3D seismic attributes, and 4D seismic attributes as the seismic data.

Example B: One or more non-transitory machine-readable media comprising program code for generating one or more reservoir 3D models, the program code to train a first machine learning model to generate one or more integrated enhanced logs based, at least in part, on an integrated data set, wherein the integrated data set includes seismic data and well log data; generate the one or more integrated enhanced logs from the first machine learning model; group the one or more integrated enhanced logs into an ensemble of integrated enhanced logs to form a static reservoir 3D model of a subterranean reservoir; input additional data to the first machine learning model to produce one or more updated integrated enhanced logs; and group the one or more updated integrated enhanced logs into an ensemble of updated integrated enhanced logs to form an updated 3D model.

In one or more embodiments of Example B the machine-readable media can further comprise program code to (in any order): (1) train a second machine learning model to generate a dynamic reservoir 3D model based, at least in part, on the updated 3D model and dynamic modeling data, wherein the dynamic modeling data includes data used to predict flow properties of the subterranean reservoir; (2) apply seismic enhancement to the seismic data to provide enhanced seismic data, wherein the first machine learning model is based on the enhanced seismic data, and, optionally, match the well log data with the enhanced seismic data to produce matched well log data, wherein the first machine learning model is based on the matched well log data; and/or (3) preselect at least one of relevant 2D seismic attributes, 3D seismic attributes, and 4D seismic attributes as the seismic data.

Example C: An apparatus comprising a processor; and a machine-readable medium having program code executable by the processor to cause the apparatus to, train a first machine learning model to generate one or more integrated enhanced logs based, at least in part, on an integrated data set, wherein the integrated data set includes seismic data and well log data; generate the one or more integrated enhanced logs from the first machine learning model; group the one or more integrated enhanced logs into an ensemble of integrated enhanced logs to form a static reservoir 3D model of a subterranean reservoir; input additional data to the first machine learning model to produce one or more updated integrated enhanced logs; and group the one or more updated integrated enhanced logs into an ensemble of updated integrated enhanced logs to form an updated 3D model.

In one or more embodiments of Example C the machine-readable medium can further comprise program code to (in any order): (1) train a second machine learning model to generate a dynamic reservoir 3D model based, at least in part, on the updated 3D model and dynamic modeling data, wherein the dynamic modeling data includes data used to predict flow properties of the subterranean reservoir; (2) apply seismic enhancement to the seismic data to provide enhanced seismic data, wherein the first machine learning model is based on the enhanced seismic data; and/or (3) match the well log data with the enhanced seismic data to produce matched well log data, wherein the first machine learning model is based on the matched well log data. In one or more embodiments of Example C, the apparatus can further comprise a user interface, wherein at least one of the static reservoir 3D model, the updated 3D model, and the dynamic reservoir 3D model is visualized via the user interface.

In one or more embodiments of Examples A, B, or C, the additional data is real-time data and/or the one or more integrated enhanced logs are machine learning generated logs of 2D properties of the subterranean reservoir.

The invention claimed is:
1. A method comprising:
training a first machine learning model using a first neural network to generate one or more integrated enhanced logs based, at least in part, on an integrated data set, wherein the integrated data set includes 2D, 3D, and 4D seismic attributes derived from a phase, a frequency, and an amplitude of seismic signal data, the 2D, 3D, and 4D seismic attributes matched to well log data by bringing at least some of the well log data and the seismic signal data used to generate the 2D, 3D, and 4D seismic attributes to a same sampling rate, the well log data including core data, production data, and drilling data;
generating the one or more integrated enhanced logs from the first machine learning model;
grouping the one or more integrated enhanced logs into an ensemble of integrated enhanced logs to form a static reservoir 3D model of a subterranean reservoir;
inputting additional data to the first machine learning model to produce one or more updated integrated enhanced logs;
grouping the one or more updated integrated enhanced logs into an ensemble of updated integrated enhanced logs to form an updated 3D model; and training a second machine learning model using a second neural network to generate a dynamic reservoir 3D model, wherein the updated 3D model and a set of dynamic modeling data are used as input for training the second machine learning model, wherein the dynamic modeling data includes data used to predict flow properties of the subterranean reservoir.

2. The method of claim 1, wherein training the first machine learning model to generate the updated 3D model and training the second machine learning model to generate the dynamic reservoir 3D model occurs concurrently and in real time.

3. The method of claim 1, further comprising:
applying seismic enhancement to the seismic signal data to provide enhanced seismic data, wherein the first machine learning model is based on the enhanced seismic data.

4. The method of claim 1, wherein the additional data is real-time data.

5. The method of claim 1, wherein the one or more integrated enhanced logs are machine learning generated logs of 2D properties of the subterranean reservoir.

6. One or more non-transitory machine-readable media comprising program code for generating one or more reservoir 3D models, the program code to:
train a first machine learning model to generate one or more integrated enhanced logs based, at least in part, on an integrated data set, wherein the integrated data set includes 2D, 3D, and 4D seismic attributes derived from a phase, a frequency, and an amplitude of seismic signal data, the 2D, 3D, and 4D seismic attributes matched to well log data by bringing at least some of the well log data and the seismic signal data used to generate the 2D, 3D, and 4D seismic attributes to a same sampling rate, the well log data including-that includes core data, production data, and drilling data;
generate the one or more integrated enhanced logs from the first machine learning model;
group the one or more integrated enhanced logs into an ensemble of integrated enhanced logs to form a static reservoir 3D model of a subterranean reservoir;
input additional data to the first machine learning model to produce one or more updated integrated enhanced logs; and
group the one or more updated integrated enhanced logs into an ensemble of updated integrated enhanced logs to form an updated 3D model; and
training a second machine learning model using a second neural network to generate a dynamic reservoir 3D model, wherein the updated 3D model and a set of dynamic modeling data are used as input for training the second machine learning model, wherein the dynamic modeling data includes data used to predict flow properties of the subterranean reservoir.

7. The one or more non-transitory machine-readable media of claim 6, further comprising program code to:
train the first machine learning model to generate the updated 3D model and train the second machine learning model to generate the dynamic reservoir 3D model concurrently and in real time.

8. The one or more non-transitory machine-readable media of claim 6, further comprising program code to:
apply seismic enhancement to the seismic signal data to provide enhanced seismic data, wherein the first machine learning model is based on the enhanced seismic data.

9. The one or more non-transitory machine-readable media of claim 6, wherein the additional data is real-time data.

10. The one or more non-transitory machine-readable media of claim 6, wherein the one or more integrated enhanced logs are machine learning generated logs of 2D properties of the subterranean reservoir.

11. An apparatus comprising:
a processor; and
a machine-readable medium having program code executable by the processor to cause the apparatus to,
train a first machine learning model to generate one or more integrated enhanced logs based, at least in part, on an integrated data set, wherein the integrated data set includes 2D, 3D, and 4D seismic attributes derived from a phase, a frequency, and an amplitude of seismic signal data, the 2D, 3D, and 4D seismic attributes matched to well log data by bringing at least some of the well log data and the seismic signal data used to generate the 2D, 3D, and 4D seismic attributes to a same sampling rate, the well log data including core data, production data, and drilling data;
generate the one or more integrated enhanced logs from the first machine learning model; group the one or more integrated enhanced logs into an ensemble of integrated enhanced logs to form a static reservoir 3D model of a subterranean reservoir;
input additional data to the first machine learning model to produce one or more updated integrated enhanced logs;
group the one or more updated integrated enhanced logs into an ensemble of updated integrated enhanced logs to form an updated 3D model; and
training a second machine learning model using a second neural network to generate a dynamic reservoir 3D model, wherein the updated 3D model and a set of dynamic modeling data are used as input for training the second machine learning model, wherein the dynamic modeling data includes data used to predict flow properties of the subterranean reservoir.

12. The apparatus of claim 11, further comprising program code to:
train the first machine learning model to generate the updated 3D model and train the second machine learning model to generate the dynamic reservoir 3D model concurrently and in real time.

13. The apparatus of claim 12, further comprising a user interface, wherein at least one of the static reservoir 3D model, the updated 3D model, and the dynamic reservoir 3D model is visualized via the user interface.

14. The apparatus of claim 11, further comprising program code to:
apply seismic enhancement to the seismic signal data to provide enhanced seismic data, wherein the first machine learning model is based on the enhanced seismic data.

15. The apparatus of claim 11, wherein the one or more integrated enhanced logs are machine learning generated logs of 2D properties of the subterranean reservoir.

* * * * *